(12) United States Patent
Inagaki

(10) Patent No.: US 9,174,318 B2
(45) Date of Patent: Nov. 3, 2015

(54) MACHINE TOOL AND CONTROL METHOD FOR THE SAME

(71) Applicant: Okuma Corporation, Niwa-Gun (JP)

(72) Inventor: Hiroshi Inagaki, Niwa-Gun (JP)

(73) Assignee: Okuma Corporation, Niwa-Gun (JP)

(*) Notice: Subject to any disclaimer, the term of this patent is extended or adjusted under 35 U.S.C. 154(b) by 31 days.

(21) Appl. No.: 14/300,321

(22) Filed: Jun. 10, 2014

(65) Prior Publication Data
US 2015/0022134 A1    Jan. 22, 2015

(30) Foreign Application Priority Data

Jul. 19, 2013    (JP) .................................. 2013-150812

(51) Int. Cl.
*G05B 5/00*    (2006.01)
*B23Q 15/08*   (2006.01)

(52) U.S. Cl.
CPC ....................................... *B23Q 15/08* (2013.01)

(58) Field of Classification Search
CPC .......... B23Q 15/08; F02B 63/04; F04C 28/08
See application file for complete search history.

(56) References Cited

U.S. PATENT DOCUMENTS

2008/0063536 A1*    3/2008    Koshizaka et al. ............. 417/32

FOREIGN PATENT DOCUMENTS

JP    2004-322246 A1    11/2004

* cited by examiner

*Primary Examiner* — Karen Masih
(74) *Attorney, Agent, or Firm* — Burr & Brown, PLLC

(57) ABSTRACT

A machine tool includes a rotational drive unit that rotationally drives a main spindle to which a tool is attached, a moving unit that relatively moves the tool with respect to the workpiece, and a rotational speed adjustment unit that adjusts a rotational speed of the main spindle by controlling the rotational drive unit. The machine tool also includes a machining start determination unit that determines that machining of the workpiece by the tool is started with the rotational drive unit rotationally driving the main spindle. The rotational speed adjustment unit exponentially raises the rotational speed of the main spindle after reducing the rotational speed to a predetermined rotational speed set in advance, on condition that the machining start determination unit determines that the machining is started, and causes the rotational speed of the main spindle to reach a value of the rotational speed before being reduced.

4 Claims, 4 Drawing Sheets

MACHINE TOOL AND CONTROL METHOD FOR THE SAME

BACKGROUND OF THE INVENTION

This application claims the benefit of Japanese Patent Application Number 2013-150812 filed on Jul. 19, 2013, the entirety of which is incorporated by reference.

FIELD OF THE INVENTION

The present invention relates to a machine tool in which the rotational speed of a main spindle to which a tool configured to machine a workpiece is attached is adjustable to a predetermined rotational speed, and to a control method for the machine tool.

DESCRIPTION OF RELATED ART

Japanese Patent Application Publication No. 2004-322246 (JP 2004-322246 A), for example, discloses a machine tool including a rotational drive unit that rotationally drives a main spindle to which a tool configured to machine a workpiece is attached, and a moving unit that relatively moves the tool with respect to the workpiece. In the machine tool, the rotational speed of the main spindle is gradually raised linearly to a final rotational speed, or the moving speed of the tool is gradually raised linearly to a final moving speed, in a machining start period, which is a predetermined period since machining of the workpiece by the tool is started, within one cycle in which the workpiece is machined by the tool. If the rotational speed of the main spindle is gradually raised linearly to the final rotational speed as in the machine tool according to JP 2004-322246 A, an impact applied to the tool during machining of the workpiece can be relieved compared to a case where the rotational speed of the main spindle is abruptly raised to the final rotational speed. Therefore, it can be expected that occurrence of chipping of the tool is suppressed.

Even in the case where the rotational speed of the main spindle is gradually raised linearly to the final rotational speed as described above, however, an impact force applied to the tool may not be reduced in the case where it is necessary to deeply cut the workpiece which is a difficult-to-machine material using the tool, for example. Thus, occurrence of chipping of the tool may not be suppressed sufficiently, and the life of the tool may be shortened.

SUMMARY OF THE INVENTION

In view of such circumstances, an object of the present invention is to provide a machine tool capable of suppressing occurrence of chipping of a tool to extend the life of the tool, and a control method for the machine tool.

A first aspect of the present invention provides a machine tool including a rotational drive unit, a moving unit, and a rotational speed adjustment unit. The rotational drive unit rotationally drives a main spindle to which a tool configured to machine a workpiece is attached. The moving unit relatively moves the tool with respect to the workpiece. The rotational speed adjustment unit is capable of adjusting a rotational speed of the main spindle by controlling the rotational drive unit. The machine tool includes a machining start determination unit that determines that machining of the workpiece by the tool is started with the rotational drive unit rotationally driving the main spindle. In the machine tool, on condition that the machining start determination unit determines that the machining is started, the rotational speed adjustment unit gradually raises a rising rate of the rotational speed of the main spindle after reducing the rotational speed to a predetermined rotational speed set in advance, and causes the rotational speed of the main spindle to reach a value of the rotational speed before being reduced.

A second aspect of the present invention provides the machine tool according to the first aspect, in which the rotational speed adjustment unit exponentially raises the rotational speed of the main spindle after being reduced to the predetermined rotational speed, and causes the rotational speed of the main spindle to reach the value of the rotational speed before being reduced.

A third aspect of the present invention provides a control method for a machine tool in which a rotational speed of a main spindle to which a tool configured to machine a workpiece is attached is adjustable by rotationally driving the main spindle to relatively move the tool with respect to the workpiece. The control method includes a machining start determination step and a rotational speed adjustment step. The machining start determination step is a step of determining that machining of the workpiece by the tool is started with the main spindle rotationally driven. The rotational speed adjustment step is a step of, on condition that it is determined in the machining start determination step that the machining is started, gradually raising a rising rate of the rotational speed of the main spindle after reducing the rotational speed to a predetermined rotational speed set in advance, and causing the rotational speed of the main spindle to reach a value of the rotational speed before being reduced.

A fourth aspect of the present invention provides the control method for a machine tool according to the third aspect, in which the rotational speed adjustment step includes exponentially raising the rotational speed of the main spindle after being reduced to the predetermined rotational speed, and causing the rotational speed of the main spindle to reach the value of the rotational speed before being reduced.

With the machine tool according to the first aspect of the present invention and the control method for a machine tool according to the third aspect of the present invention, an impact applied to the tool during machining of the workpiece can be relieved by reducing the rotational speed of the main spindle, to which the tool is attached, to the predetermined rotational speed immediately after machining of the workpiece by the tool is started. Hence, occurrence of chipping of the tool can be suppressed. Further, an impact applied to the tool can also be relieved by suppressing an abrupt rise in rotational speed of the main spindle since machining of the workpiece is started until the rotational speed of the main spindle reaches the value of the rotational speed before being reduced. Therefore, occurrence of chipping of the tool can be suppressed. As a result, the life of the tool can be extended.

According to the second and fourth aspects of the present invention, an abrupt rise in rotational speed of the main spindle can be suppressed until the rotational speed of the main spindle which has been reduced to the predetermined rotational speed reaches the value of the rotational speed before being reduced. Consequently, an impact applied to the tool can be relieved until the rotational speed of the main spindle reaches the value of the rotational speed before being reduced. Thus, occurrence of chipping of the tool can be suppressed.

DETAILED DESCRIPTION OF THE EMBODIMENTS

Figure 1:
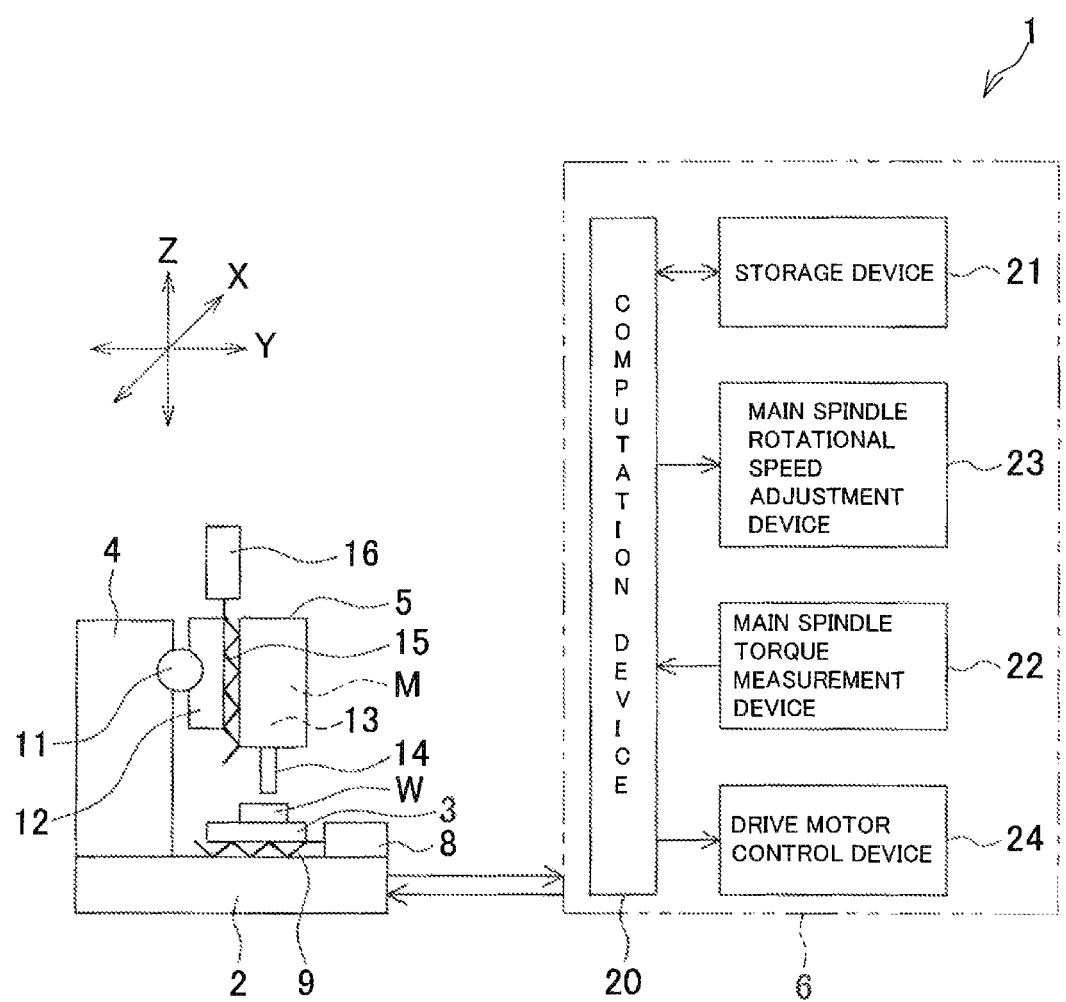
FIG. 1 is a schematic diagram of a machining center according to an embodiment of the present invention.

An embodiment of the present invention will be described with reference to FIGS. 1 to 4. As illustrated in FIG. 1, a machining center 1 includes a base 2, a table 3, a column 4, a spindle head 5, and a control device 6. The machining center 1 is an example of the machine tool according to the present invention.

The table 3 and a first drive motor 8 are provided on the upper surface of the base 2. A ball screw 9 that extends in the front-rear direction (Y direction) of the base 2 is concentrically coupled to a rotary shaft of the first drive motor 8. A nut member (not illustrated) fixed to the table 3 is threadably engaged with the ball screw 9. When the ball screw 9 is rotated by driving the first drive motor 8, the nut member is moved in the Y direction. This allows the table 3 to move in the Y direction. A workpiece W is removably mounted on the upper surface of the table 3.

The column 4 is provided to stand upright in rear of the table 3 (on the left side in FIG. 1) on the upper surface of the base 2. A drive shaft 11 that extends in the left-right direction (X direction) as the column 4 is viewed from the front is rotatably supported on the front surface of the column 4 (on the right side in FIG. 1). The drive shaft 11 is concentrically coupled to a rotary shaft of a second drive motor (not illustrated). A saddle 12 is disposed on the front side of the drive shaft 11 (on the right side in FIG. 1). A nut member (not illustrated) fixed to the saddle 12 is threadably engaged with the drive shaft 11. The saddle 12 is provided with the spindle head 5 located over the table 3. A tool spindle 13, to which a tool 14 is mounted, is supported by spindle head 5 so as to be directed downward. A main spindle motor M configured to rotate the tool spindle 13 is built in the spindle head 5. A nut member (not illustrated) fixed to the spindle head 5 is threadably engaged with a ball screw 15 that extends in the up-down direction (Z direction) of the saddle 12. The ball screw 15 is concentrically coupled to a rotary shaft of a third drive motor 16 fixed to the saddle 12. In the machining center 1, when the drive shaft 11 is rotated by driving the second drive motor, the nut member of the saddle 12 is moved in the X direction. As a result, the tool 14 can be moved in the X direction together with the saddle 12. When the ball screw 15 is rotated by driving the third drive motor 16, meanwhile, the nut member of the spindle head 5 is moved in the Z direction. As a result, the tool 14 provided at the spindle head 5 can be moved in the Z direction. To perform cutting on the workpiece W by the tool 14, the tool 14 is moved in the Z direction while rotating the tool 14 by rotating the tool spindle 13 by the main spindle motor M to cut into the workpiece W, the tool 14 is moved in the X direction, and the table 3 is moved in the Y direction. The first and third drive motors 8 and 16, the second drive motor, the ball screws 9 and 15, the drive shaft 11, and the respective nut members of the table 3, the spindle head 5, and the saddle 12 are an example of the moving unit according to the present invention. The main spindle motor M is an example of the rotational drive unit according to the present invention.

As illustrated in FIG. 1, the control device 6 includes a computation device 20, a storage device 21, a main spindle torque measurement device 22, a main spindle rotational speed adjustment device 23, and a drive motor control device 24. The storage device 21 is connected to the computation device 20. The storage device 21 stores radius data on the respective radii of various types of tools 14 that can be mounted to the tool spindle 13, threshold torque data for the tool spindle 13, a calculation formula for calculating a command rotational speed for controlling the rotational speed of the main spindle motor M for the purpose of suppressing occurrence of chipping of the tool 14, command rotational speed data for controlling the rotational speed of the main spindle motor M at the time of starting of the main spindle motor M, command rotational speed data for controlling the respective rotational speeds of the first and third drive motors 8 and 16 and the second drive motor, and a numerical control (NC) program. As discussed later, the threshold torque data are used to detect whether or not cutting performed on the workpiece W by the tool 14 has been started.

The main spindle torque measurement device 22 is connected to the computation device 20. The main spindle torque measurement device 22 is disposed inside the spindle head 5 and outside the tool spindle 13. By way of example, the main spindle torque measurement device 22 measures torque to be applied to the tool spindle 13 on the basis of an electromotive force generated in a coil of the main spindle torque measurement device 22 during cutting performed on the workpiece W by the tool 14. The computation device 20 can receive measured torque data for the tool spindle 13 from the main spindle torque measurement device 22.

The main spindle rotational speed adjustment device 23 is connected to the computation device 20. The main spindle rotational speed adjustment device 23 is connected to the main spindle motor M. As discussed later, in the case where it is determined that the measured torque data are more than the threshold torque data, the computation device 20 calculates the command rotational speed for controlling the rotational speed of the main spindle motor M using the calculation formula stored in the storage device 21. When a rotational speed command matching the command rotational speed is received from the computation device 20, the main spindle rotational speed adjustment device 23 transmits the rotational speed command to the main spindle motor M.

The drive motor control device 24 is connected to the computation device 20. The drive motor control device 24 is connected to the first and third drive motors 8 and 16 and the second drive motor. When cutting is performed on the workpiece W by the tool 14 on the basis of the NC program, the drive motor control device 24 receives the command rotational speed data stored in the storage device 21 from the computation device 20. When the command rotational speed data are received, the drive motor control device 24 transmits a rotational speed command matching the command rotational speed data to the first and third drive motors 8 and 16 and the second drive motor. This causes the rotary shafts of the first drive motor 8 etc. to rotate at a predetermined speed. As a result, the tool 14 is moved in the X direction and the Z direction, and the table 3 is moved in the Y direction.

Figure 2:
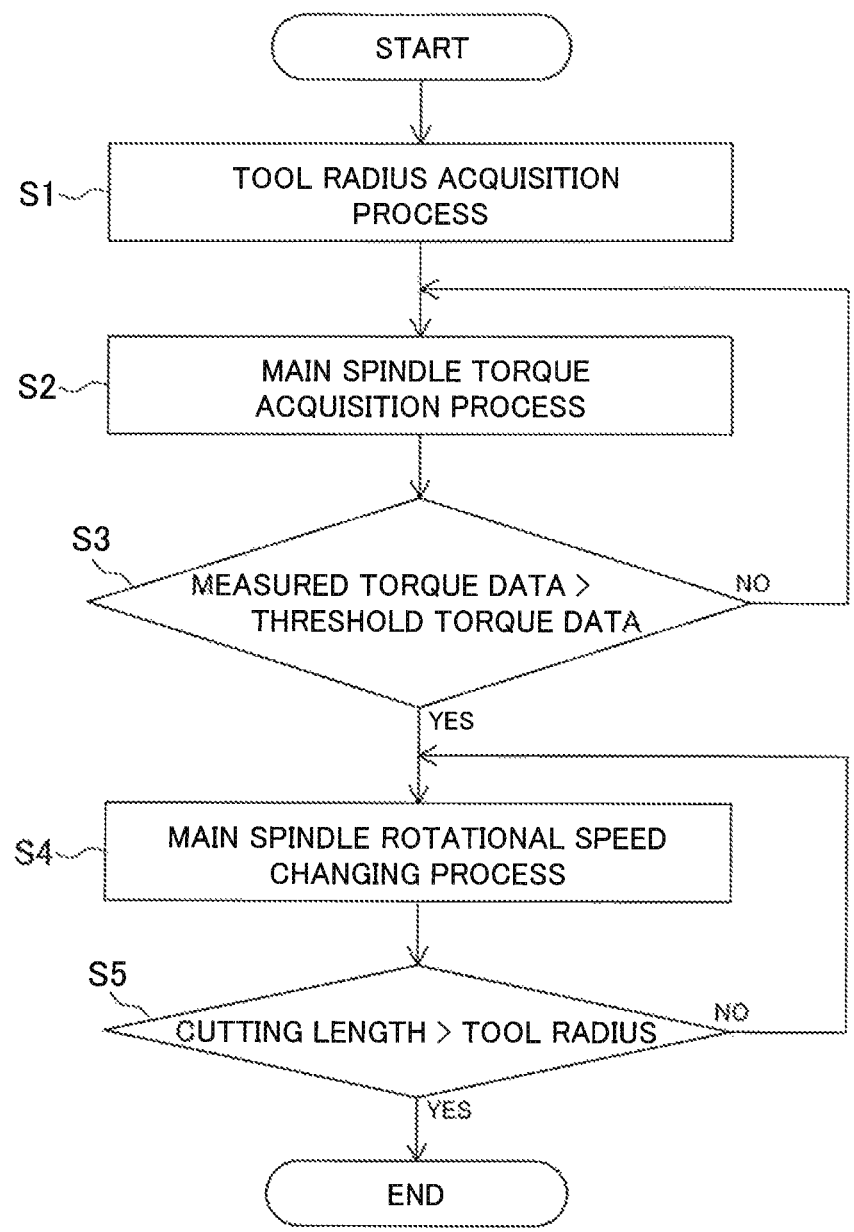
FIG. 2 is a flowchart of a process in which a rotational speed of a main spindle is raised exponentially in the machining center.

Next, a method for the control device 6 to adjust the rotational speed of the tool spindle 13 in a range where the cutting length of the workpiece W to be cut by the tool 14 is less than the radius of the tool 14 will be described with reference to the flowchart of FIG. 2. When power for the control device 6 is turned on, the computation device 20 executes a tool radius acquisition process (S1). In the tool radius acquisition process (S1), the radius data for the tool 14 mounted to the tool spindle 13 are acquired from the storage device 21.

After the tool radius acquisition process (S1), the computation device 20 executes a main spindle torque acquisition process (S2). In the main spindle torque acquisition process (S2), measured torque data for the tool spindle 13 measured by the main spindle torque measurement device 22 are acquired when cutting is performed on the workpiece W by the tool 14 rotated at a predetermined rotational speed by the main spindle motor M on the basis of a rotational speed command matching the command rotational speed data at the time of starting of the main spindle motor M stored in the storage device 21.

After the main spindle torque acquisition process (S2), the computation device 20 reads the threshold torque data from the storage device 21. The computation device 20 then compares the measured torque data acquired in the main spindle torque acquisition process (S2) and the threshold torque data to determine whether or not the measured torque data are more than the threshold torque data (S3). In the case where cutting is not performed on the workpiece W by the tool 14 and it is determined in S3 that the measured torque data are less than the threshold torque data, the process returns to the main spindle torque acquisition process (S2). In the case where cutting performed on the workpiece W by the tool 14 is started with the tool 14 rotated at a predetermined rotational speed by the main spindle motor M and it is determined in S3 that the measured torque data are more than the threshold torque data, on the other hand, the computation device 20 executes a main spindle rotational speed changing process (S4). The computation device 20 repeatedly executes the main spindle rotational speed changing process (S4) until it is determined in S5 that the cutting length is more than the radius of the tool 14. In the embodiment, it is determined that cutting performed on the workpiece W by the tool 14 is started in the case where it is determined in S3 that the measured torque data are more than the threshold torque data. This allows the main spindle rotational speed changing process (S4) to be executed from a correct machining start point.

In the main spindle rotational speed changing process (S4), a command rotational speed $S_C$ for controlling the rotational speed of the main spindle motor M is consecutively calculated using the following formula (1) stored in the storage device 21 until the cutting length becomes more than the radius of the tool 14. The computation device 20 consecutively transmits command rotational speed data matching the command rotational speed $S_C$ to the main spindle rotational speed adjustment device 23 until the cutting length becomes more than the radius.

$$S_C = S_0 \times \{0.8 + 0.2 \times \exp[-7.5 \times (r-L)/r]\} [\text{min}^{-1}] \quad (1)$$

In the formula, $S_0$ is the command rotational speed [min$^{-1}$] for the tool spindle 13, r is the radius [mm] of the tool 14, and L is the cutting length [mm].

Figure 3:
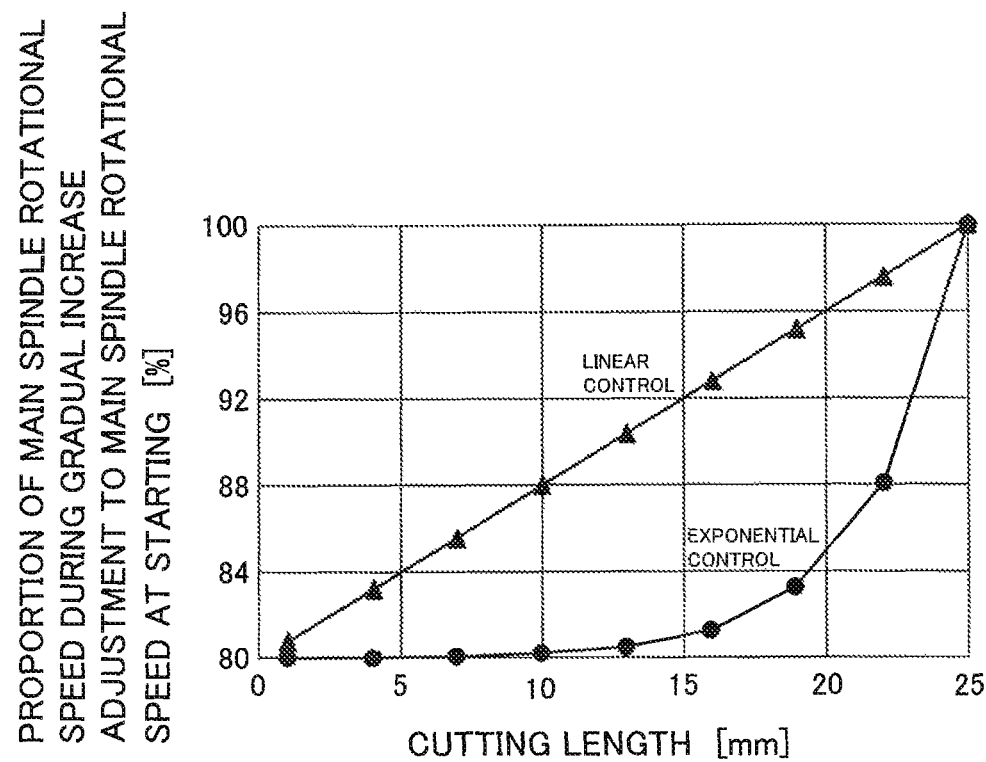
FIG. 3 is a graph illustrating the proportion of the main spindle rotational speed during gradual increase adjustment to the main spindle rotational speed at the time of starting with respect to the cutting length.

In the main spindle rotational speed changing process (S4), the main spindle rotational speed adjustment device 23 consecutively provides the main spindle motor M with a rotational speed command that matches the command rotational speed data consecutively received from the computation device 20. The command rotational speed $S_C$ that matches the command rotational speed data is reduced to 80% of the command rotational speed $S_0$ for the tool spindle 13 immediately after cutting performed on the workpiece W by the tool 14 is started. The command rotational speed $S_C$ is then gradually increased exponentially along with an increase in cutting length (L) to reach a value corresponding to 100% of the command rotational speed $S_0$ when the cutting length (L) becomes equal to the radius (r) of the tool 14. Therefore, upon receiving a rotational speed command matching the command rotational speed $S_C$, the main spindle motor M exponentially raises the rotational speed of the tool spindle 13 after reducing the rotational speed to 80% of that at the time of starting immediately after cutting is started. Then, the rotational speed of the tool spindle 13 reaches a value corresponding to 100% of that at the time of starting when the cutting length (L) becomes equal to the radius (r, which is 25 mm in the example), as illustrated in FIG. 3. Herein, control in which the rotational speed of the tool spindle 13 is raised exponentially after being reduced to 80% of that at the time of starting is referred to as exponential control. An impact applied to the tool 14 during cutting can be relieved by reducing the rotational speed of the tool spindle 13 to which the tool 14 is mounted to 80% of that at the time of starting immediately after cutting is started through the exponential control. Hence, occurrence of chipping of the tool 14 can be suppressed. Further, an impact applied to the tool 14 can also be relieved by suppressing an abrupt rise in rotational speed of the tool spindle 13 since cutting is started until the rotational speed of the tool spindle 13 reaches the value of the rotational speed at the time of starting. This also makes it possible to suppress occurrence of chipping of the tool 14. The computation device 20 and the main spindle rotational speed adjustment device 23 are an example of the rotational speed adjustment unit according to the present invention. 80% of the rotational speed of the tool spindle 13 at the time of starting is an example of the predetermined rotational speed according to the present invention. The main spindle rotational speed changing process (S4) is an example of the rotational speed adjustment step according to the present invention.

When the computation device 20 determines in S5 that the cutting length is more than the radius of the tool 14, the main spindle rotational speed changing process (S4) is terminated, and cutting is performed on the workpiece W by the tool 14 on the basis of the NC program while rotating the tool spindle 13 at the rotational speed at the time of starting. In the embodiment, the main spindle rotational speed changing process (S4) is executed only in a range where the cutting length is less than the radius of the tool 14, and the time until the cutting length becomes equal to the radius is significantly short compared to the total time of cutting of the workpiece W. Thus, even if the rotational speed of the tool spindle 13 is reduced from that at the time of starting during execution of the main spindle rotational speed changing process (S4), the total machining time for the workpiece W is extended only slightly and not significantly.

Figure 4:
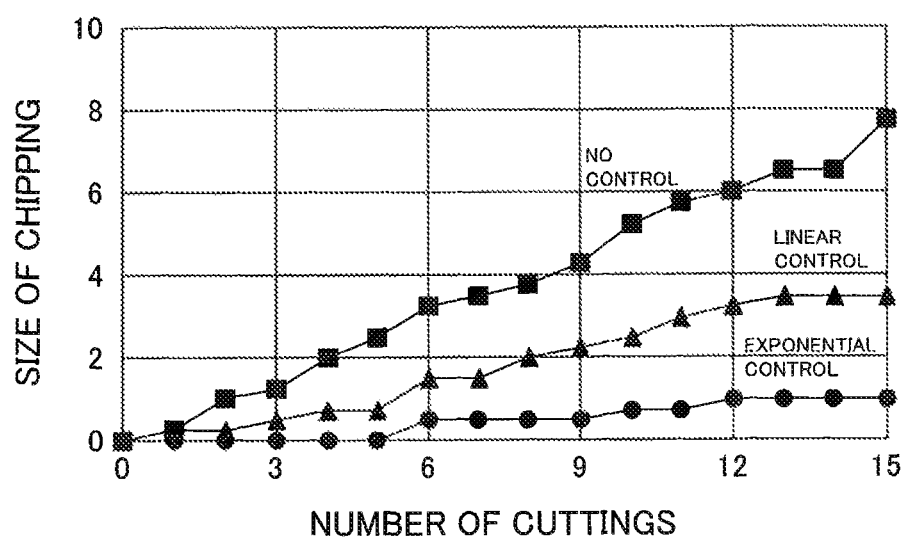
FIG. 4 is a graph illustrating the size of chipping with respect to the number of cuttings.

FIG. 4 illustrates an example in which the size of chipping of the tool 14 with respect to the number of cuttings was measured for different control methods for the rotational speed of the tool spindle 13. Measurement conditions were as follows. The workpiece W was made of a titanium alloy. The tool 14 was a milling tool with a diameter of 50 mm. The cutting speed was 45 m/min. The feed speed was 0.1 mm/blade. The cutting depth in the axial direction of the tool was 15 mm. The cutting depth in the radial direction of the tool was 50 mm. Cutting of a groove was performed with four blades. The exponential control discussed above, linear control (see FIG. 3), and no control were selected as the control methods for the rotational speed. In the linear control, the rotational speed was raised linearly after being reduced to 80% of that at the time of starting immediately after cutting of the groove was started, and the rotational speed was caused to reach a value corresponding to 100% of that at the time of starting when the cutting length became equal to the radius of the milling tool. With no control, the rotational speed was maintained at a value corresponding to 100% of that at the time of starting since immediately after cutting of the groove was started until the cutting length became equal to the radius of the milling tool. With any of the control methods, as illustrated in FIG. 4, chipping of the milling tool became larger along with an increase in number of cuttings performed by the milling tool. The measurement results indicated that when the number of cuttings was 15, the size of chipping with the exponential control was ⅛ of the size of chipping with no control, and ⅓.5 of the size of chipping with the linear control. Thus, it was found that occurrence of chipping was suppressed to the greatest degree when the exponential control, among the three control methods, was performed. This is because, when the exponential control is performed, the rotational speed of the tool spindle 13 is raised only slightly from 80% of that at the time of starting for a while since cutting performed on the workpiece W by the milling tool is started, and therefore chipping is less likely to occur if the rotational speed of the tool spindle 13 is reduced from that at the time of starting for a long time. Even in the case where it is necessary for the milling tool to deeply cut a difficult-to-machine material, occurrence of chipping of the milling tool can be suppressed when the exponential control is performed, compared to cases with no control or the linear control, as seen from the measurement results in FIG. 4. As a result, the life of the milling tool can advantageously be extended even for deep cutting.

EFFECTS OF EMBODIMENT

With the machining center 1 according to the embodiment and the control method for the machining center 1, an impact applied to the tool 14 during cutting can be relieved by reducing the rotational speed of the tool spindle 13, to which the tool 14 is mounted, to 80% of that at the time of starting immediately after cutting performed on the workpiece W by the tool 14 is started. Hence, occurrence of chipping of the tool 14 can be suppressed. Further, an impact applied to the tool 14 can also be relieved by suppressing an abrupt rise in rotational speed of the tool spindle 13 since cutting is started until the rotational speed of the tool spindle 13 reaches the value of the rotational speed at the time of starting. Therefore, occurrence of chipping of the tool 14 can be suppressed. As a result, the life of the tool can be extended.

The present invention is not limited to the embodiment discussed above, and the configuration of the embodiment may be partially modified as appropriate without departing from the scope and spirit of the present invention. Although occurrence of chipping of the tool 14 is suppressed by performing the exponential control in the embodiment discussed above, the present invention is not limited thereto. For example, in order to suppress occurrence of chipping, the rotational speed of the tool spindle 13 may be raised along a upwardly concave curve having a gradually increasing rising rate and defined by a quadratic function, a cubic function, or a hyperbolic function after being reduced to 80% of that at the time of starting, and caused to reach a value corresponding to 100% of the rotational speed of the tool spindle 13 at the time of starting. Consequently, an impact applied to the tool 14 can be relieved by suppressing an abrupt rise in rotational speed of the tool spindle 13 since cutting is started until the rotational speed of the tool spindle 13 reaches the value of the rotational speed at the time of starting as in the embodiment discussed above. Hence, occurrence of chipping of the tool 14 can be suppressed.

Unlike the embodiment discussed above, the rotational speed of the tool spindle 13 may be raised exponentially after being reduced to an appropriate rotational speed that is less than 80% of that at the time of starting. Further, occurrence of chipping may be suppressed by performing the exponential control also in a range in which the cutting length is more than the radius of the tool while suppressing significant extension of the total cutting time for the workpiece W. In addition, unlike the embodiment discussed above, it may be determined that cutting performed on the workpiece W by the tool 14 is started when a command for feed in the X direction, the Y direction, and the Z direction is switched from a fast feed command for use to move the tool 14 closer to and away from the work (workpiece W) to a cutting feed command for use during machining, for example. Besides, it may be determined that cutting is started by executing a machining control program having a command code specifying a cutting start point at which cutting performed on the workpiece W by the tool 14 is started, and causing the computation device 20 to analyze the command code.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A machine tool including a rotational drive unit that rotationally drives a main spindle to which a tool configured to machine a workpiece is attached, a moving unit that relatively moves the tool with respect to the workpiece, and a rotational speed adjustment unit capable of adjusting a rotational speed of the main spindle by controlling the rotational drive unit, comprising:

a machining start determination unit that determines that machining of the workpiece by the tool is started with the rotational drive unit rotationally driving the main spindle, wherein the rotational speed adjustment unit gradually raises a rising rate of the rotational speed of the main spindle after reducing the rotational speed to a predetermined rotational speed set in advance, on condition that the machining start determination unit determines that the machining is started, and causes the rotational speed of the main spindle to reach a value of the rotational speed before being reduced.

2. The machine tool according to claim 1, wherein the rotational speed adjustment unit exponentially raises the rotational speed of the main spindle after being reduced to the predetermined rotational speed, and causes the rotational speed of the main spindle to reach the value of the rotational speed before being reduced.

3. A control method for a machine tool in which a rotational speed of a main spindle to which a tool configured to machine a workpiece is attached is adjustable by rotationally driving the main spindle to relatively move the tool with respect to the workpiece, comprising:

a machining start determination step of determining that machining of the workpiece by the tool is started with the main spindle rotationally driven; and a rotational speed adjustment step of gradually raising a rising rate of the rotational speed of the main spindle after reducing the rotational speed to a predetermined rotational speed set in advance, on condition that it is determined in the machining start determination step that the machining is started, and causing the rotational speed of the main spindle to reach a value of the rotational speed before being reduced.

4. The control method for a machine tool according to claim 3, wherein the rotational speed adjustment step includes exponentially raising the rotational speed of the main spindle after being reduced to the predetermined rotational speed, and causing the rotational speed of the main spindle to reach the value of the rotational speed before being reduced.

* * * * *